United States Patent [19]
Myers

[11] 3,847,227
[45] Nov. 12, 1974

[54] GARDEN TOOL

[76] Inventor: Herman A. Myers, 112 No. Liberty, Masontown, Pa. 15461

[22] Filed: June 5, 1973

[21] Appl. No.: 367,135

[52] U.S. Cl.................... 172/378, 30/302, 172/22, 175/403, 294/50.7
[51] Int. Cl.................... A01b 1/16, A01b 45/02
[58] Field of Search............ 172/371, 378, 381, 22; 145/116 R; 175/18, 402, 403; 408/204, 206, 207; 294/50.7; 30/130, 301, 302, 316

[56] References Cited
UNITED STATES PATENTS

| | | | |
|---|---|---|---|
| 799,880 | 9/1905 | Tonge | 175/403 X |
| 2,152,707 | 4/1939 | Orr | 175/403 X |
| 2,708,593 | 5/1955 | Benoist | 172/22 X |
| 2,812,969 | 11/1957 | Fornelius | 172/22 X |
| 3,198,719 | 8/1965 | Stewart | 172/378 X |
| 3,291,231 | 12/1966 | Kammer | 294/50.7 X |

FOREIGN PATENTS OR APPLICATIONS

| | | | |
|---|---|---|---|
| 179,945 | 3/1905 | Germany | 175/403 |

Primary Examiner—Robert E. Pulfrey
Assistant Examiner—Paul T. Sewell
Attorney, Agent, or Firm—Webb, Burden, Robinson & Webb

[57] ABSTRACT

An improved auger-like device for boring holes in the earth comprising an elongated, rod-shaped brace member having a handle at one end and a U-shaped portion adjacent the handle suitable for rotative movement about the longitudinal axis of the brace. A cylindrical bit member having a sidewall which defines an open interior, is attached to an end of the brace. The bit member includes a plurality of teeth integral therewith and depending outwardly from its sidewall and spaced around the circumference thereof. The teeth include a plurality of inclined driving teeth interposed between longitudinally extending cutting teeth.

2 Claims, 4 Drawing Figures

PATENTED NOV 12 1974 3,847,227
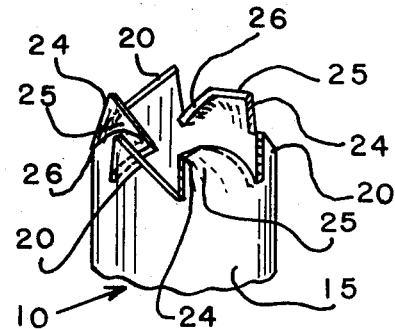
Fig. 4
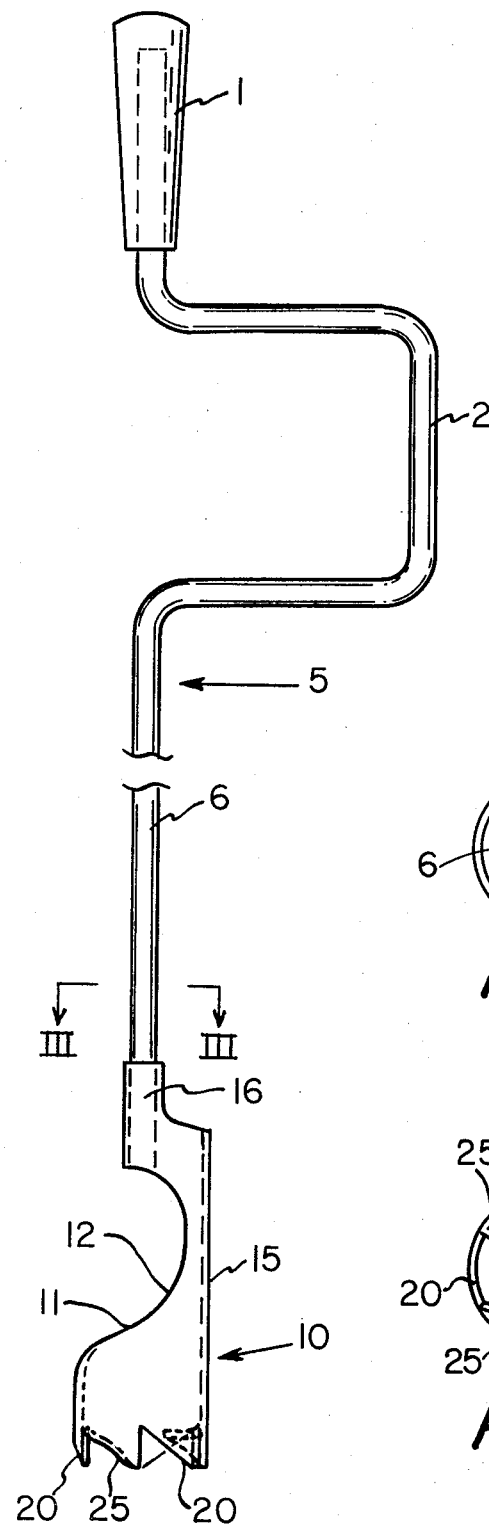
Fig. 1
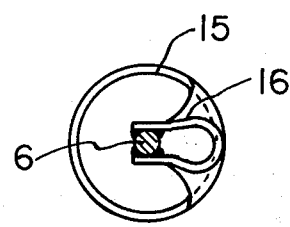
Fig. 3
Fig. 2

GARDEN TOOL

My invention relates generally to garden tools and more particularly to a hand operated garden tool which resembles a brace and bit auger. The homeowner is often times faced with the many problems of lawn and garden care. Of particular concern is weed control in the lawn. In order to control the various weeds indigenous to lawns, such as the dandelion, the homeowner must either apply dangerous chemicals to the weeds or he must undertake the laborious task of digging the weeds by hand. This latter task is usually done with the aid of a hand-held gardening scoop or the common V-bladed weeding tool. In either case, the heretofore manual method of weeding, using conventional gardening tools requires the person performing the task to either kneel or bend from the waist in order to extract the weeds. This is, likewise, true if the homeowner-gardener wishes to dig holes for planting bulbs or seedlings or for aerating or fertilizing shrubs and trees.

My invention solves the problems and inconvenience heretofore encountered by providing a garden tool which permits the user to perform various tasks such as weeding, hole digging and aerating, without the necessity of bending, kneeling or stooping.

The device of my invention provides a garden tool which may be easily manipulated by hand, while the user remains in a standing, upright position.

Briefly, my garden tool comprises an elongated brace member having a handle at one end and a U-shaped portion adjacent said handle suitable for rotative movement about the longitudinal axis of said brace member. A bit is also provided and is attached to the end of the brace opposite the handle end thereof. The bit has a hollow interior which is defined by its cylindrical sidewall. A plurality of teeth depend outwardly from the sidewall of the bit and are spaced around the circumference thereof. The teeth include a plurality of inclined driving teeth, each interposed between a pair of longitudinally extending cutting teeth.

In the drawings:

FIG. 1 is a side elevational view of a presently preferred embodiment of the garden tool of my invention;

FIG. 2 is a plan view of the bit end of the device of FIG. 1;

FIG. 3 is a sectional view taken along line III—III of FIG. 1; and

FIG. 4 is a partial perspective view of the toothed bit member.

A presently preferred embodiment of my garden tool is depicted in FIG. 1. The device comprises elongated, rod-shaped member, generally designated 5. Elongated member 5 is constructed of a strong material such as steel which is capable of withstanding torsional stresses. Member 5 includes a handle 1 attached at one end thereof and a U-shaped driving portion 2 adjacent said handle 1. Elongated member 5 also includes an elongated shaft 6 which extends from driving portion 2; the longitudinal axis of shaft 6 is aligned with the longitudinal axis of the handle in the manner of usual brace constructions. As in conventional brace constructions, brace member 5 may be rotatively moved about its longitudinal axis when handle 1 is grasped by the operator with one hand and U-shaped portion 2 is rotatably driven with the other hand. Elongated member 5 may be rotated about its longitudinal axis in other ways. For example, U-shaped portion 2 could be eliminated and a T-shaped handle could be attached at the handle end 2 of member 5 (not shown). Shaft 6 of member 5 extends a sufficient length to permit the operator to rotatably drive member 5 while he remains in a standing, upright position.

A hollow boring bit 10 is fixedly attached to the terminal end of shaft 6, preferably by welding. Bit 10 is also constructed of a strong material, such as steel, and naturally should be capable of withstanding the abrasive wear caused by earth boring operations. Bit 10 is formed in the shape of an open cylinder having a sidewall 15 which defines open interior 11. Sidewall 15 includes a narrowed neck 16 at one end to permit the attachment of bit 10 to shaft 16. Shaft 16 is aligned with the longitudinal axis of bit 10 to allow concentric rotation of bit 10 when brace 5 is rotatably operated, FIG. 3. Bit 10 also has a plurality of teeth 20, 25 integral therewith and depending outwardly from the terminal edge of sidewall 15. Teeth 20, 25 being positioned in spaced relationship around the perimeter of sidewall 15 of bit 10.

As best seen in FIGS. 2 and 4, the teeth of boring bit 10 include a plurality of inclined, driving teeth 25 which are angularly bent toward the open interior 11 of bit 10. Interposed alternately between inclined driving teeth 25 are longitudinally extending cutting teeth 20. Cutting teeth 20 are coextensive with and longitudinally aligned with sidewall 11. As such, teeth 20 dig the perimeter of the bore hole when brace 5 is rotatably operated. During operation, inclined driving teeth 25 tend to pull bit 10 into the earth, due to the fact that the trailing edges 26 of teeth 25 are inclined at a greater angle relative to sidewall 11 than are leading edges 24, FIG. 4. The inclined configuration of teeth 25 also causes the loosened earth to be driven upwardly within open interior 11 as bit 10 is rotatably driven into the bore hole.

Sidewall 15 of bit 10 also has a cutout area 12 positioned above teeth 20, 25 to permit the loosened earth to be discharged from interior 11 of bit 10. Cutout portion 12 is also functional when the device is used to remove weeds, such as dandelions. Bit 10 is placed around the stem of the dandelion with the dandelion flower protruding from cutout portion 12. When brace 5 is rotatably operated in this way, longitudinally extending teeth 20 cut the leaves of the weed while inclined teeth 25 cut and twist the roots. After several rotations of brace 5, the leaves of the weed are completely cut and the roots are partially cut by the action of teeth 20 and 25. The remaining uncut roots are tightly intertwined due to the rotative action of inclined teeth 25 acting thereon, which permits their quick and easy removal by simply raising brace 5 upwardly from the ground. The weed and its roots remain within interior 11 of bit 10 when the brace 5 is raised from the bore hole due to the inward inclination of teeth 25. After the weed and roots have been severed and brace 5 raised, the weed may be easily extracted from bit 10 by simply pulling it through cutout portion 12.

Preferably, the terminal edges of teeth 20 and 25 are sharp to insure efficient cutting and digging of weeds and earth. Periodically, when the need arises, the teeth may be resharpened with a file or abrasive stone in order to maintain cutting and boring efficiency.

Hence, it can be appreciated that my garden tool is useful for extracting weeds without the necessity of bending or stooping as was heretofore common practice. My garden tool is also useful for digging holes for planting flower bulbs or seedlings or digging holes for aerating or fertilizing around shrubs and trees. All of these tasks can be performed while the operator remains in a standing, upright position.

I claim:

1. A hand-operated garden tool for weeding and boring holes in the earth comprising:
   a. an elongated rod shaped member including a handle at one end and an elongated shaft at the other end, said elongated member adapted for rotative movement about its longitudinal axis when rotatably manipulated by the operator;
   b. a cylindrical boring bit having a sidewall which defines an open interior, said bit fixedly attached at one end thereof to the end of the shaft, the longitudinal axis of the cylindrical bit aligned with the longitudinal axis of the shaft, said boring bit also including a plurality of teeth depending downwardly from the terminal edge of the sidewall in spaced apart relationship around the perimeter thereof, said teeth comprising a plurality of inclined driving teeth angularly bent toward the open interior of the bit, each of said driving teeth having a leading edge and a trailing edge, said trailing edge being inclined a greater angle, relative to the sidewall of the bit, than the angular inclination of the leading edge and a plurality of longitudinally extending, cutting teeth aligned coextensively with the sidewall of the bit, said driving teeth and said cutting teeth alternately positioned with respect to one another around the perimeter of the sidewall of the boring bit, said sidewall also having a cutout portion positioned above the teeth to permit the removal of weeds and earth from the interior of the bit.

2. The garden tool of claim 1 wherein the elongated rod shaped member includes a U-shaped portion integrally positioned between said handle and said shaft suitable for rotative movement about the longitudinal axis of the elongated rod shaped member when the handle is grasped and the U-shaped portion is rotatably manipulated by the operator.

* * * * *